(12) United States Patent
Jensen

(10) Patent No.: US 8,718,889 B2
(45) Date of Patent: May 6, 2014

(54) KINETIC ENERGY SYSTEM AND METHOD FOR HYBRID MACHINE

(75) Inventor: Jeffrey Edward Jensen, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 107 days.

(21) Appl. No.: 13/408,391

(22) Filed: Feb. 29, 2012

(65) Prior Publication Data

US 2013/0226419 A1     Aug. 29, 2013

(51) Int. Cl.
*B60K 6/30*     (2007.10)
*B60K 6/28*     (2007.10)
*B60K 6/22*     (2007.10)

(52) U.S. Cl.
USPC .............. 701/68; 192/70.21; 180/165; 74/11; 74/661

(58) Field of Classification Search
USPC ......... 701/67, 68, 99; 192/70.11, 48.8, 70.21; 180/165; 74/11, 661
See application file for complete search history.

(56) References Cited

U.S. PATENT DOCUMENTS

| | | | |
|---|---|---|---|
| 4,595,371 A | | 6/1986 | Heston |
| 4,928,553 A | * | 5/1990 | Wagner .......................... 475/268 |
| 5,111,924 A | * | 5/1992 | Reik et al. .................. 192/70.17 |
| 5,931,249 A | * | 8/1999 | Ellis et al. ...................... 180/165 |
| 5,947,855 A | | 9/1999 | Weiss |
| 6,568,518 B2 | * | 5/2003 | Sarar ............................ 192/48.8 |
| 6,585,091 B2 | * | 7/2003 | Reinhart et al. .............. 192/3.28 |
| RE38,258 E | * | 9/2003 | Reik et al. .................. 192/70.17 |
| 7,108,095 B1 | | 9/2006 | Washington et al. |
| 7,270,030 B1 | * | 9/2007 | Belloso ........................... 74/661 |
| 7,478,693 B1 | * | 1/2009 | Curtis ........................... 180/165 |
| 7,654,355 B1 | | 2/2010 | Williams |
| 8,006,794 B2 | | 8/2011 | Gramling et al. |
| 2009/0020354 A1 | | 1/2009 | Roth |
| 2010/0242672 A1 | * | 9/2010 | Gutsche ......................... 74/84 R |
| 2010/0270810 A1 | | 10/2010 | Liebermann |
| 2010/0280712 A1 | | 11/2010 | Bowman |

FOREIGN PATENT DOCUMENTS

| | | |
|---|---|---|
| DE | 20 2007 015 050 U1 | 1/2008 |
| JP | 06-190598 A | 7/1994 |
| JP | 2008-296630 A | 12/2008 |
| JP | 2010-221906 A | 10/2010 |

OTHER PUBLICATIONS

Kenny et al, Integrated Power and Attitude Control with Two Flywheels, IEEE Transactions on Aerospace and Electronics Systems, vol. 41, No. 4, Oct. 2005, pp. 1431-1449.*

* cited by examiner

*Primary Examiner* — Russell Frejd
(74) *Attorney, Agent, or Firm* — Miller, Matthias & Hull

(57) ABSTRACT

A kinetic energy system incorporates multiple flywheels, each flywheel situated and adapted to develop and store kinetic energy, and to subsequently impart that energy to move a work machine. Each flywheel is controlled by an ECM to operate in a selective sequence with respect to any of the other flywheels. Each flywheel has its own individual external gear and clutch unit adapted to be in communication with a commonly shared continuously variable transmission. The plurality of flywheels may be operated sequentially to develop, store, and dispense kinetic energy equivalently to that of a substantially larger unitary flywheel. In the disclosed embodiment and method of operation, the flywheel system may be employed with a traditional internal combustion engine to produce a hybrid motive source, with capability for effectively meeting transient load demands of an off-road work machine.

22 Claims, 2 Drawing Sheets

KINETIC ENERGY SYSTEM AND METHOD FOR HYBRID MACHINE

TECHNICAL FIELD

This disclosure relates to a kinetic energy system involving a plurality of flywheels coupled through a clutch system to a single transmission. More particularly, the disclosure relates to the management of transient kinetic energy demands through sequential operation of the flywheels.

BACKGROUND

Engine driven flywheels have been long recognized as energy dense sources from which mechanical work may be derived. Demands on flywheels have become increasingly greater as engines and prime mover systems have become larger and more powerful. As such, flywheels and their associated elements have tended to evolve into larger, more massive structures. Such structures have become commensurately more expensive. Thus, there has been considerable pressure to reduce costs of flywheel systems.

One approach has been to utilize more efficient flywheels, including flywheels adapted to rotate at considerably higher speeds within vacuum housings. While this approach has been determined effective to produce greater amounts of energy from single flywheel units, there remains a demand for the use of even greater amounts of energy storage and use, particularly with increasingly greater requirements of large off-highway machines.

SUMMARY OF THE DISCLOSURE

In one disclosed embodiment, a flywheel system incorporates multiple flywheels, each flywheel situated and adapted to develop rotary mechanical, hence kinetic, energy, to store that energy, and to impart that energy to move a work machine, power up a hydraulic accessory, or perform some other mechanical task. Each flywheel may be operated in a controlled sequence with respect to any of the other flywheels.

In accordance with another aspect of the disclosed embodiment, each flywheel has an external gear and clutch unit adapted to be in communication with a single common transmission.

In accordance with another aspect of the disclosed embodiment, a plurality of flywheels may be operated sequentially to develop, to store, and to dispense kinetic energy equivalently to that of a substantially larger unitary flywheel.

In accordance with yet another aspect of the disclosed embodiment, the flywheel system may work in concert with a power source, such as an internal combustion engine, to produce a hybrid motive source having dual prime mover capability effective to propel an off-road work machine.

DETAILED DESCRIPTION

Figure 1:
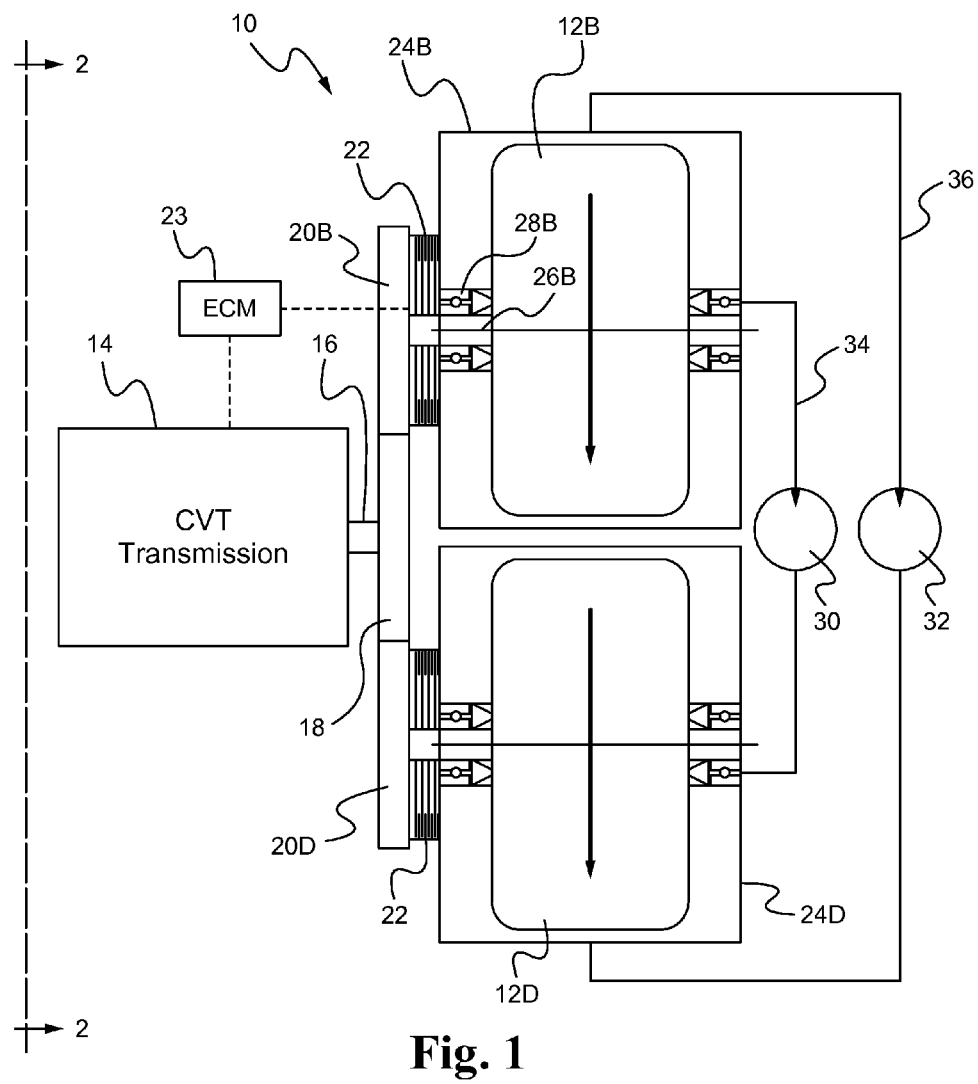
FIG. 1 is a schematic side view of a flywheel system for a hybrid work machine constructed in accordance with the disclosed embodiment.
Figure 2:
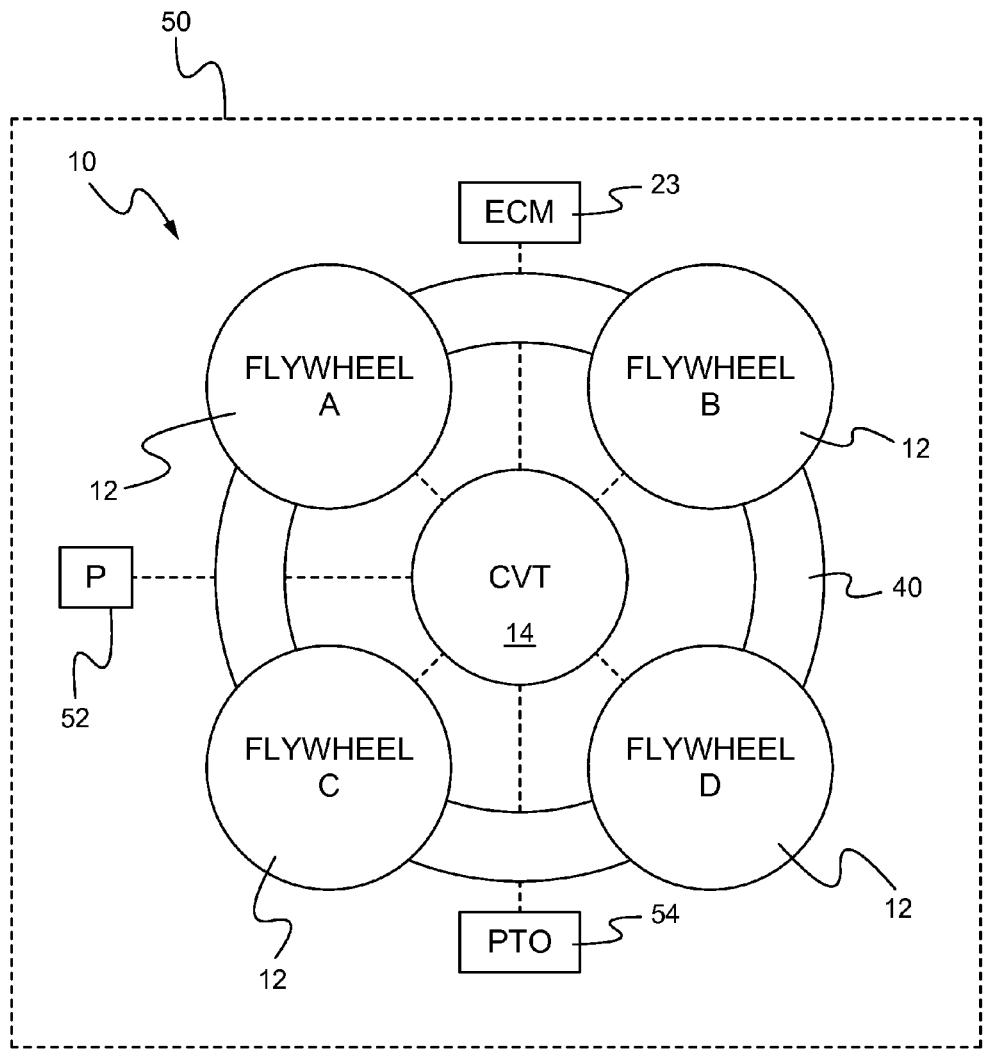
FIG. 2 is a schematic frontal view of the same flywheel system, as displayed along lines 2-2 of FIG. 1.

Referring now to both FIGS. 1 and 2, a kinetic energy system 10 may be adapted for use in a mobile work machine 50 that may be adapted to perform certain and/or various work functions. The system 10 includes a plurality of flywheels 12A, 12B, 12C, and 12D, arranged as particularly shown in FIG. 2. Each of the flywheels may be coupled to a common single continuously variable transmission 14 (hereinafter called a CVT) by means of a CVT shaft and gear arrangement. More particularly, a CVT shaft 16 may contain a CVT gear 18, as shown in FIG. 1. The gear 18 may be adapted to simultaneously and constantly engage each of flywheel drive gears 20A, 20B, 20C, and 20D.

Interposed between each flywheel gear 20 (A, B, C, or D) and its associated flywheel 12 (A, B, C, or D) may be a clutch pack 22 (A, B, C, or D). Each clutch pack 22 may be uniquely and individually controlled via a controller, such as an electronic control module (ECM) 23. The ECM 23 may also control the CVT 14, which may be actuated by a power source 52 for the purpose of sequentially engaging each of the flywheels 12 for storage of kinetic energy, and for the subsequent release of that energy in accordance with a predetermined sequential algorithm. As such, the kinetic energy system 10 may be adapted to utilize a single CVT 14 and associated clutch packs 22 to, for example, engage and store kinetic energy first in the flywheel 12A, disengage from that flywheel and engage and store kinetic energy in the flywheel 12B, and so on, in sequence. In such case, the controller or ECM 23 may be adapted to electronically communicate with both the CVT 14 and the clutch packs 22. Conversely, the energy may subsequently be transferred from, or dispensed, on a flywheel-by-flywheel basis in a similar sequential manner.

Each of the flywheels 12A, 12B, 12C, and 12D may be adapted for high-speed rotation within its individual vacuum housing 24A, 24B, 24C, and 24D, and each flywheel may be supported on flywheel shafts 26A, 26B, 26C, and 26D, in turn supported on flywheel bearings 28A, 28B, 28C, and 28D (although for purposes of simplicity only 26B and 28 B are depicted).

A lubrication pump 30 and a vacuum pump 32 (both shown in FIG. 1) may be respectively coupled to lube lines 34 and vacuum lines 36. The lubrication pump 30 and lube lines 34 may be adapted to ensure adequate lubrication to the bearings 28. The vacuum pump 32 and vacuum lines 36 may be adapted to maintain sufficient vacuum within the vacuum housings 24 in a manner such that the flywheels may rotate with the lowest possible air resistance, as those skilled in the art will appreciate.

Although shown in the described embodiment as individual vacuum housings 24A, 24B, 24C, and 24D, an alternate embodiment may utilize a common single vacuum housing 24 (not shown) for containing the plurality of the flywheels 12. Thus both embodiments of singular construction as well as the depicted plural vacuum housings may be considered as within the scope of this disclosure.

A structural support 40, also shown schematically in FIG. 2, may physically secure together the entire plurality of flywheels 12A, 12B, 12C, and 12D, in a symmetric configuration, as shown. Although a ring-shaped configuration for the support 40 about the CVT 14 is depicted, numerous other configurations may be envisioned to fall within the scope of this disclosure, such as square, octagonal, etc.

Finally, the ECM 23 may be effectively programmed to control the CVT 14, along with the clutch packs 22, to provide for sequential operation of the described multiple flywheels 12, as further detailed below. A method of operation of the disclosed hybrid kinetic energy system is also presented below.

INDUSTRIAL APPLICABILITY

The described kinetic energy system 10 may be useful in a variety of hybrid machines, including cyclical machines such as wheel loaders, excavators and other work machines. As disclosed, the kinetic energy system may replace costly large unitary flywheels by employing a plurality of smaller flywheels, each having smaller masses, and operating in programmed sequence to store and deliver kinetic energy. The use of such machines in concert with an internal combustion engine may enable the use of smaller internal combustion engines, thus reducing the carbon footprint associated with the operation of such engines.

In operation, the kinetic energy system 10 may be particularly effective in long cycle machines, such as machines adapted to haul off-highway loads. During long declines or descents, the internal combustion engine or drivetrain energy, or some combination of both, may provide energy for actuation of the CVT 14 to energize the flywheels 12, thereby saving energy otherwise lost as heat during operation of the work machine's brakes. As such, the CVT 14 may be utilized to sequentially spin each flywheel 12 up to a predetermined speed, thus providing each flywheel with appropriately designed amounts of kinetic energy. During subsequent ascent of the work machine, the kinetic energy stored in each flywheel 12 may then be sequentially utilized to reduce the amount of energy otherwise demanded by the internal combustion engine for powering the transient uphill movement of the machine.

Those skilled in the art will appreciate that the latter flywheel energy transfers may also be conveniently available to provide load leveling; i.e. the reduction of peak power demands on the engine, and thus may otherwise enable the use of smaller internal combustion engines for any given application.

A method of using the kinetic energy system 10 may include the steps of:
   providing multiple flywheels in a work machine, with each flywheel having a drive gear;
   providing a CVT with a gear in engagement with each of the flywheel drive gears;
   providing a system of individual flywheel clutch packs, each clutch pack situated between a flywheel gear and associated flywheel, each clutch pack adapted to engage and control rotation of that one flywheel;
   providing and adapting an ECM to monitor and control the CVT to simultaneously and individually control each flywheel clutch pack so as to enable the CVT to sequentially engage each clutch pack to develop kinetic energy sequentially in each flywheel; and
   providing and adapting the ECM to subsequently transfer kinetic energy sequentially from each flywheel to provide motive power to the work machine during transient periods of power demand.

The kinetic energy system 10 may also facilitate provision of a system of multiple flywheels that utilize off-the-shelf components, requiring little or no modifications from flywheel manufacturers, as opposed to having to rely on special design and engineering considerations otherwise required to build large unitary flywheels. Moreover, the system may utilize a single vacuum and lube pump for cost savings, to the extent that the ECM 23 may be capable of staging sequential energy storage and release through programmed use of the CVT 14 and clutch packs 22.

Finally, the kinetic energy system 10 may also provide for the connection to the CVT 14 of a power take-off 54 (FIG. 2) in lieu of simply transferring all of the kinetic energy back into the internal combustion engine. As such, the kinetic energy system 10 may offer a more versatile flywheel and internal combustion engine hybrid system configuration.

What is claimed is:

1. A kinetic energy system, comprising:
   a power source,
   multiple flywheels, each flywheel having a drive gear and clutch unit;
   a transmission selectively driven by the power source, and selectively and operatively connected to each flywheel to drive or be driven by each flywheel; and
   a controller communicatively connected to the transmission and each flywheel, and configured to generate signals to selectively connect the power source to the transmission to drive the transmission, and generate signals to selectively and sequentially connect the transmission to each of the flywheels.

2. The kinetic energy system of claim 1, wherein the controller is configured to store kinetic energy from drivetrain energy during downhill descents of the work machine, and to subsequently dispense the drivetrain energy directly into an internal combustion engine of the work machine.

3. The kinetic energy system of claim 1, further comprising a power take-off operatively connected to the transmission to be selectively driven by the transmission.

4. The kinetic energy system of claim 1, wherein the clutch unit of each flywheel comprises a clutch pack interposed between that flywheel and its associated flywheel drive gear.

5. The kinetic energy system of claim 4, wherein the clutch pack and associated drive gear of each flywheel are physically interposed between the transmission and the flywheel.

6. The kinetic energy system of claim 1, wherein the transmission is a continuously variable transmission, and wherein the flywheels are supported circumferentially with respect to one another on a common support member about the continuously variable transmission.

7. The kinetic energy system of claim 6, wherein the support member is ring-shaped.

8. The kinetic energy system of claim 1, wherein each flywheel is situated in an individual vacuum housing.

9. The kinetic energy system of claim 1, wherein each flywheel is situated in a single shared vacuum housing.

10. A kinetic energy system for a hybrid work machine, comprising:
    a power source;
    a flywheel system comprising multiple flywheels, each having a drive gear and clutch unit;
    a transmission selectively driven by the power source, and selectively and operatively connected to each flywheel to drive or be driven by each flywheel; and
    a controller communicatively connected to the transmission and each flywheel, and configured to generate signals to selectively connect the power source to the transmission to drive the transmission, and generate signals to selectively and sequentially connect the transmission to each of the flywheels.

11. The kinetic energy system of claim 10, wherein the controller is configured to store mechanical energy from drivetrain energy during downhill descents of the work machine, and to subsequently dispense the drivetrain energy directly to an internal combustion engine of the work machine.

12. The kinetic energy system of claim 10, further comprising a power take-off operatively connected to the transmission to be selectively driven by the transmission.

13. The kinetic energy system of claim 10, wherein the clutch unit of each flywheel comprises a clutch pack interposed between that flywheel and its associated flywheel drive gear.

14. The kinetic energy system of claim 13, wherein the clutch pack and associated drive gear of each flywheel are physically interposed between the transmission and the flywheel.

15. The kinetic energy system of claim 10, wherein the transmission is a continuously variable transmission, and wherein the flywheels are supported circumferentially with respect to one another on a common support member about the continuously variable transmission.

16. The kinetic energy system of claim 15, wherein the support member is ring-shaped.

17. The kinetic energy system of claim 10, wherein each flywheel is situated in an individual vacuum housing.

18. The kinetic energy system of claim 10, wherein each flywheel is situated in a single shared vacuum housing.

19. A method of using a kinetic energy system, comprising the steps of:
   providing multiple flywheels in a work machine, with each flywheel having a drive gear;
   providing a CVT with a gear in engagement with each of the flywheel drive gears;
   providing a system of individual flywheel clutch packs, each clutch pack situated between a flywheel gear and associated flywheel to engage and control rotation of that one flywheel;
   providing an ECM to monitor and control the CVT to simultaneously and individually control each flywheel clutch pack so as to enable the CVT to sequentially engage each clutch pack to develop kinetic energy sequentially in each flywheel; and
   the ECM subsequently controlling the CVT and each flywheel clutch pack to transfer kinetic energy sequentially from each flywheel to provide motive power to the work machine during transient periods of power demand.

20. A method of recovering stored kinetic energy in a machine having work functions, comprising:
   selectively driving a transmission with a first flywheel;
   selectively driving the transmission with a second flywheel;
   selectively driving the output of a power source with the transmission to augment the power source and increase power available for the work functions.

21. A method of storing kinetic energy in a machine having work functions, comprising:
   selectively driving a transmission with a power source when the power source produces greater power than needed for the work functions;
   selectively driving a first flywheel with the transmission; and
   selectively driving a second flywheel with the transmission.

22. The method of claim 19, further comprising the steps of:
   providing a vacuum housing about each flywheel;
   providing a vacuum pump and vacuum lines between the vacuum housings and the pump to support and maintain a vacuum within each of the housings.

* * * * *